United States Patent [19]

Wakasugi et al.

[11] Patent Number: 4,606,951
[45] Date of Patent: Aug. 19, 1986

[54] WATER-RESISTING AND OIL-RESISTING LAMINATED SHEET

[75] Inventors: Keizo Wakasugi; Yuji Fujita; Ryoichi Kaneko, all of Toyama, Japan

[73] Assignee: Kohjin Co., Ltd., Tokyo, Japan

[21] Appl. No.: 691,013

[22] Filed: Jan. 14, 1985

[30] Foreign Application Priority Data

Jan. 17, 1984 [JP] Japan .................................. 59-4766

[51] Int. Cl.$^4$ ........................ B32B 27/10; B65D 30/08
[52] U.S. Cl. ........................................ 428/35; 428/236;
428/514; 383/109; 383/113; 383/116
[58] Field of Search .................. 428/35, 514; 383/109,
383/113, 116; 428/236

[56] References Cited

U.S. PATENT DOCUMENTS

| 3,488,252 | 1/1970 | Lamar | 428/514 |
| 3,706,590 | 12/1972 | Moyer et al. | 428/514 |
| 3,891,089 | 6/1975 | Goodwin et al. | 428/514 |

FOREIGN PATENT DOCUMENTS

| 55-2273 | 1/1980 | Japan . | |
| 55-141182 | 11/1980 | Japan . | |
| 0186698 | 10/1983 | Japan | 428/514 |
| 0224747 | 12/1983 | Japan | 428/514 |

Primary Examiner—John E. Kittle
Assistant Examiner—James J. Seidleck
Attorney, Agent, or Firm—Parkhurst & Oliff

[57] ABSTRACT

A water-resisting and oil-resisting laminated sheet, the oil resistance of which is not reduced by alcohol, prepared by laminating an ethylene-vinyl acetate copolymer layer and a paper, which paper is coated or impregnated with a liquid or a coating composition and then dried by heating. The copolymer layer has a vinyl acetate component of 10 to 30 mole %, a melt flow index of 2 to 20, and a thickness of 10 to 50$\mu$. The liquid is in an amount of 0.5 to 5% by weight to the paper as solid component and is prepared by mixing an aqueous solution or an aqueous dispersion of an oil-resisting polymer such as polyvinyl alcohol, etc., with an aqueous dispersion of a perfluoroalkyl acrylate copolymer at 3:7 to 7:3 by solid component ratio, adding thereto 0.1 to 3% by weight of a penetrating agent such as polyalkylene glycol or derivatives thereof, and diluting with water. The coating composition is composed of 100 parts by weight of a reactive silicone-acrylate resin emulsion and 20 to 100 parts by weight of a perfluoroalkyl acrylate copolymer which is diluted with water in an amount of 0.5 to 5% by weight to the paper as solid component. Also, a water-resisting and oil-resisting food-keeping means capable of controlling the diffusing amount of alcohol vapor comprising a bag, at least a part of which is composed of the aforesaid laminated sheet prepared by using a previously printed paper, and an alcohol component enclosed in the bag.

10 Claims, No Drawings

WATER-RESISTING AND OIL-RESISTING LAMINATED SHEET

FIELD OF THE INVENTION

This invention relates to a laminated sheet having excellent water resistance and oil resistance. More particularly, the invention relates to a water-resisting and oil-resisting laminated sheet having an alcohol vapor permeability, which is a base material composed of a laminate of a specific thermoplastic resin film and a paper, said paper being subjected to an oil resisting treatment. The invention also relates to a food keeping means composed of a bag of the foregoing water-resisting and oil-resisting laminated sheet having enclosed therein an alcohol or a composition of alcohol.

BACKGROUND OF THE INVENTION

Hitherto, as food keeping means, a desiccating agent such a silica gel, quick lime, etc., and a deoxidating agent mainly composed of iron powder are known. Also, there are a method of enclosing the aforesaid desiccating agent or a deoxidating agent in a food-containing package to remove moisture or oxygen required for the growth of microorganisms in the package; a method of utilizing the sterilizing power of alcohol, i. e., a method directly adding or spraying a liquid alcohol addded, if necessary, with a perfume to foods or directly enclosing the alcohol in a package simultaneously with packaging a food, and an indirect alcohol addition method of enclosing an alcohol-enclosed bag or container in a food-containing package to give an antiseptic action and antimold activity by the alcohol vapor diffused from the bag.

In these methods, the indirect alcohol addition method can keep the effect successively after temporarily opening the food-containing package since the alcohol vapor is continuously diffused from the bag or container for a long period of time and such a method is proposed in, for example, Japanese Patent Publication No. 2273/'80. That is, according to the method described in Japanese Patent Publication No. 2273/'80, a so-called powder alcohol prepared by absorbing ethanol onto a solid absorptive material is enclosed in a bag or container made by a laminate of finely perforated polyethylene film or polyester film and a paper but this method has the following problems.

(1) When a food contains water, an oil, etc., the bag is swelled or the paper layer is wetted, which makes the bag unsuitable for a food keeping means.

(2) When a trade name, instructions for use, designs for improving beauty sight, etc., are printed on the surface of the bag or container the food quality keeping agent, the printing ink is dissolved out or left out because of oil in the food.

Also, as another indirect alcohol addition method, there is known a method of enclosing a liquid containing ethanol in a container at least one layer of which is composed of an ethylene-vinyl acetate copolymer film, etc., having excellent permeability for ethanol vapor, whereby the ethanol gas is diffused out through the film as described in Japanese Patent Laid-open No. 141,182/'80.

However, in the case of the foregoing method, heat sealing is required for sealing the container after packing a contents in the container, but since the film is melted by the heat at heat sealing and the molten film thus formed sticks to a sealing bar, high speed packing work is impossible by the method and the method is lacking in practicability.

For solving these problems, there is provided a method of laminating a heat-resisting paper to the non-sealing surface of the film, whereby the printability and shielding properties of the film are also improved but there are further problems about oil resistance and water resistance.

As a method of improving the oil resistance and water resistance of a paper, there is known a method of coating a liquid containing a water-dispersing fluorine compound as an oil resisting agent, a penetrating agent and a water repellent as necessary components on a paper or impregnating a paper with the foregoing liquid. However, the oil resisting sheet obtained by the method is insufficient in an alcohol resistance. That is, there is a problem that the oil resistance of the sheet is reduced with the passage of time in the presence of alcohol.

SUMMARY OF THE INVENTION

An object of this invention is, therefore, to provide a water-resisting and oil-resisting laminated sheet having an excellent alcohol permeability, which is not deteriorated by water or oils contained in foods and the oil resistance of which is not affected by the presence of alcohol.

Another object of this invention is to provide a food keeping means composed of a bag made of the foregoing alcohol vapor-permeable water-resisting and oil-resisting laminated sheet having enclosed therein an alcohol or a composition of alcohol.

That is, this invention is a laminated sheet composed of an alcohol vapor-permeable ethylene-vinyl acetate copolymer film and a paper treated with an oil resistance imparting agent of a specific composition containing a perfluoroalkyl acrylate copolymer as an indispensable component. The invention is also a food keeping means composed of a container such as a bag, etc., using the aforesaid laminated sheet as at least a part thereof and enclosing therein an alcohol or a powdery or granular carrier impregnated with an alcohol.

DESCRIPTION OF THE PREFERRED EMBODIMENT

Any plastic films which are impermeable for liquid alcohol but are permeable for alcohol vapor may be used as the plastic film layer in this invention and there are, for example, a cellophane film, a nylon film, an ethylene-vinyl acetate copolymer (hereinafter, referred to as EVA) film, etc., but from the aspects of the heat sealing property, alcohol vapor permeability, and processability, an ethylene-vinyl acetate copolymer film layer having a vinyl acetate content of 10 to 30 mole %, a melt flow index (hereinafter, referred to as MI) of 2 to 20, and a thickness of 10 to 50$\mu$ is preferred.

If the vinyl acetate content in EVA is less than 10 mole %, the film is poor in alcohol vapor permeability and is not suitable for practical use and if the content is higher than 30 mole %, the alcohol vapor permeability may be good but the film shows an undesirable blocking property. Also, if MI of EVA is lower than 2, the film-forming property and the adhesive property of the film with a paper are insufficient and if MI is higher than 20, the mechanical strength of the film and the heat seal strength thereof are undesirably insufficient. Thus, MI of EVA is 2 to 20, preferably 5 to 15. Furthermore, if the thickness of the EVA film which is used for the base material in this invention is thinner than 10μ, the heat seal strength of the film is insufficient in the case of making a bag for containing an alcohol component and if the EVA thickness is thicker than 50μ, the heat seal strength may be very high but the alcohol vapor permeability becomes low. Thus, the EVA thickness is suitably 10 to 50μ, more preferably 20 to 40μ.

Since the alcohol vapor permeability and the heat seal property of the EVA film are influenced by the content of vinyl acetate, MI of EVA, and the thickness of the EVA film as described above, the composition and the thickness of the EVA film are properly selected according to the kind of foods to be packed in the food package, the necessary diffusion amount of alcohol, the amount of alcohol to be packed in the container, etc. If necessary, the composition of the EVA film may further contain a slipping agent, an antiblocking agent, a coloring agent, and other conventional additives.

The above-described EVA film is laminated with a paper for supplementing the strength, the covering property, the printability, the oil resistance, and processing for the water and oil repellency. Both the elements may be laminated with each other by any desired method if the alcohol vapor permeability of the laminate is not reduced but it is practical to laminate the EVA resin on a paper subjected to an oil resisting treatment by extrusion laminating.

There is is no particular restriction about a paper to be laminated with the EVA film. The paper for use in this invention may contain a sizing agent, a strength agent such as a starch, a latex, an acrylic resin, etc.; a wet strength agent; a softening agent such as glycerol, etc.; a coloring agent; etc.

The paper having printed thereon a trade name, an instruction for use, various designs, etc., is sometimes used as the paper substrate for the laminated sheet of this invention. In this case, a water resisting and oil resisting treatment is applied to the paper for preventing the printed ink from being dissolved off or left out by the alcohol enclosed in the container or water and oil contained in the food when the printed surface of the paper is brought into contact with the food.

There is no particular restriction on the water-resistance and oil-resistance treating agent which is used for treating the paper in this invention if the agent is not attacked by the alcohol enclosed in the container and water and oil contained in the food and also the paper treated by the agent is permeable for alcohol vapor. A specific example of the treating agent is an aqueous mixture of an oil resistance treating agent containing a poly(meth)acrylate copolymer having a perfluoroalkyl group of 3 to 20 carbon atoms as the main component and at least one oil resisting polymer such as polyvinyl alcohol, polyvinylidene chloride, an ionomer, polybutadiene, polychloroprene, a poly(meth)acrylic acid ester, etc., at 3:7 to 7:3 by solid component ratio.

If the content of the polymer in the aforesaid mixture is too small, the effect of improving the water resistance, the water repellency, and the oil resistance being not affected by the presence of alcohol is not obtained and also if the content of the polymer is too large, the effect for the oil resistance and the alcohol vapor permeability of the treated paper are undesirably reduced. The concentration of the coating composition or the impregnating composition can be changed in the range of 0.5 to 30% according to the coating system to be employed. The impregnated amount or the coated amount of the composition is desirably 0.5 to 5% by weight to the weight of the paper substrate from the aspects of economy and for insuring the alcohol vapor permeability.

Also, the foregoing treatment is ordinarily applied to a paper having applied thereto various kinds of prints and according to the extent of printing, the kinds of inks, the printed amount of inks, and the number of colors, it sometimes happens that the treatment with the coating composition or impregnating composition becomes difficult. This is also true for the sized paper. Such a difficultly can be overcome by adding a penetrating agent which does not reduce the effect of the fluorine-containing compound as oil resistance treating agent and gives no toxicity to the food when the penetrating agent is brought into contact with the food to the treating composition.

Examples of such a penetrating agent are polyethylene glycol having a molecular weight of 200 to 1,000, polypropylene glycol having a molecular weight of 200 to 1,000, a block copolymer of ethylene glycol and propylene glycol, or alkyl ethers of, or fatty acid esters of the foregoing materials. The penetrating agent is added to the above-described aqueous coating composition or impregnating composition in an amount of 0.1 to 3.0% by weight.

When the water-resisting and oil-resisting sheet of this invention is used as, for example, a food keeping means for packaging foods containing a large amount of water or humidity and hence, in particular, the water resistance of the sheet is required to increase, a water resisting, oil repellent, and releasing property can be imparted to the sheet together with the oil resistance by subjecting the sheet to the water resisting and oil resisting treatment as described below.

That is, for the water resisting and oil resisting treatment, a coating composition composed of 100 parts by weight of a reactive silicone-acrylate resin emulsion and 20 to 100 parts by weight of a perfluoroalkyl acrylate copolymer is preferably used as the surface coating film-forming composition having an oil resistance, an alcohol resistance and an alcohol vapor permeability. The coating amount is selected in the range of 0.5 to 5 g/m$^2$ according to the desired performance but is preferably about 2 g/m$^2$. The concentration of the treating composition or coating composition differs according to a coating device to be employed and does not restrict the coating method. In the case of coating the printed surface only of the paper by a Mayer bar system, it is preferred that the concentration of the treating composition be about 20% in solid content. After coating the coating composition, the sheet is dried at 120° to 140° C. by electric heater, steam heating, hot blast heating, etc.

The oil-resisting laminated sheet of this invention is converted into a bag form and a liquid alcohol or powdery alcohol is enclosed therein or after packing a powder of, for example, a crystalline cellulose, silica gel, sugar, calcium carbonate, etc., in the bag, a liquid alcohol is poured in the bag to be absorbed on the powder or to be held in voids in the powder particles followed by heat-sealing. Since the alcohol thus enclosed in the bag made of the laminated sheet of this invention is gradually diffused therethrough, the bag can be preferably used as a food-keeping means. In this case, the bag-forming material is not swollen or does not become fragile by water or an oil contained in the foods as well as the peeling-off of printed material on the paper by water and oil in the foods does not occur, and further the reduction of the oil resistance of the laminated sheet by the enclosed alcohol does not occur. Thus, the food-keeping means of this invention is very convenient and useful. Also, since the oil resisting laminated sheet of this invention can gradually diffuse an effective component capable of being dissolved or dispersed in an alcohol, such as, for example, a perfume, a deodorant, a mothproofing agent, a rust preventive, etc., the laminated sheet of this invention is also useful as a material for the containers or packaging materials of these components.

In the case of enclosing a liquid alcohol, the container of this invention may have a different form from a conventional image. For example, the container can be utilized as a label-form container or a sheet-form container rather than a bag. In the case of increasing the area of the container through which an alcohol is diffused by employing the aforesaid form of container, the alcohol can be freely filled in the narrow space of the thin container and by employing such an embodiment, the permeation of alcohol can be freely controlled as described above.

Then, the examples of this invention are practically explained herein below together with comparison examples and reference examples but the invention is not restricted by these examples. In addition, all parts and percentages in these examples, unless otherwise indicated, are by weight.

REFERENCE EXAMPLES 1 TO 4

A paper stock composed of 80 parts of a soft-wood kraft pulp and 20 parts of a hard wood pulp was mildly beaten and then 20 parts of rayon fibers of 1.5 denier and 4 mm in length and 10 parts of fibrous PVA (polyvinyl alcohol) of 3 mm in length were added to the beaten stock. Then, after adding thereto a polyamide epichlorohydrin resin as wet strength agent in an amount of 0.5% to the weight of the pulps and rayon fibers, a rayon paper having a basis weight of 44 g/m² was manufactured using the above-described mixture. Then, an ethylene-vinyl acetate resin having a vinyl acetate content of 19% and MI of 15 was extruded through a T-die and laminated on the rayon paper thus manufactured to form the resin layer having a thickness of $13.0\mu$, $23.8\mu$, $32.6\mu$, or $46.1\mu$. Thus, 4 kinds of sample sheets were prepared.

The properties of these samples are shown in Table 1 below. The tensile strength and tearing strength shown in the table were measured by the test method of JIS-P and also the thickness of the film and the heat seal strength were measured according to the methods of JIS Z 1526.

The adhesive strength of the film was measured as follows. The sample sheet was cut into 15 mm in width and 150 mm in length in the manufacturing direction of the paper and the paper layer and the EVA film layer were carefully peeled off from each other from the end thereof in the lengthwise direction using a Tensilon Universal Test Machine (made by Toyo Baldwin K. K.) at a peeling angle of 180° and a peeling rate of 100 mm/min, and the adhesive strength was shown by the tensile strength at peeling.

The alcohol vapor permeability was measured as follows. A test piece of 60 mm × 120 mm was cut from each of the EVA laminate samples and after folding the test piece to an area of 60 mm × 60 mm with the EVA laminate layer at the inside, two edges were heat-sealed to form a bag having internal dimensions of 45 mm × 50 mm. Then, 6 ml of ethanol was poured in the bag and then the outlet of the bag was heat-sealed. The bag was suspended in an incubator at 40° C. and at a relative humidity of 15% and from the weight loss of the bag after 24 hours, the alcohol vapor permeability was calculated by the following equation.

$$(A) \ (g/m^2) = (B)/0.045m \times 0.050m \times 2$$

(A): Alcohol vapor permeability
(B): Initial weight of the bag—weight of the bag after 24 hours.

REFERENCE EXAMPLES 5 AND 6

Two kinds of samples were prepared by laminating an ethylene-vinyl acetate resin having a vinyl acetate content of 19% and MI of 7 on the rayon paper as used in Reference Examples 1 to 4 by extruding the resin thereon through a T-die at thicknesses of $19.0\mu$ and $29.8\mu$, respectively and the properties of these samples are shown in Table 1 below.

REFERENCE EXAMPLES 7 AND 8

Two kinds of samples were prepared by laminating an ethylene-vinyl acetate resin having a vinyl acetate content of 21% and MI of 7 on the rayon paper as used in Reference Examples 1 to 4 by extruding the resin thereon through a T-die at thicknesses of $19.0\mu$ and $28.8\mu$, respectively and the properties of these samples are shown in Table 1 below.

TABLE 1

| Reference Example | 1 | 2 | 3 | 4 | 5 | 6 | 7 | 8 |
|---|---|---|---|---|---|---|---|---|
| Vinyl acetate content (%) | 19 | 19 | 19 | 19 | 19 | 19 | 21 | 21 |
| MI | 15 | 15 | 15 | 15 | 7 | 7 | 7 | 7 |
| Film thickness ($\mu$) | 13.0 | 23.8 | 32.6 | 46.1 | 18.7 | 30.4 | 19.0 | 29.8 |
| Tensile strength (g/15 mm) | | | | | | | | |
| longitudinal direction | 3.9 | 3.9 | 4.1 | 4.5 | 4.0 | 4.6 | 4.2 | 4.8 |
| transverse direction | 1.3 | 1.3 | 1.4 | 1.6 | 1.3 | 1.4 | 1.3 | 1.4 |
| Tearing strength (g) | | | | | | | | |
| longitudinal direction | 56 | 60 | 64 | 84 | 80 | 112 | 82 | 128 |
| transverse direction | 84 | 88 | 104 | 112 | 198 | 146 | 188 | 198 |
| Film adhesive strength (g/15 mm) | 36.4 | 44.3 | 72.1 | 88.5 | 30.6 | 67.3 | 40.4 | 67.0 |
| Heat seal strength (g/15 mm) | 312 | 379 | 558 | 955 | 341 | 631 | 340 | 600 |
| Alcohol vapor permeability (g/m² · 24 hr · 40° C.) | 1100 | 613 | 535 | 442 | 750 | 520 | 845 | 650 |

As shown in Table 1, Reference Examples 1 to 4, the relation between the thickness of the EVA resin layer laminated on the rayon paper at the same vinyl acetate content and the same MI value and the alcohol vapor permeability shows that the thickness of about $20\mu$ is a boundary for the increase of the alcohol vapor permeability, that is, the alcohol vapor permeability gradually decreases when the thickness of the EVA resin layer becomes thicker than about 20°, while the alcohol vapor permeability rapidly increases with the decrease of thickness in the region thinner than about 20μ. Accordingly, it is clear that by grasping the behavior of the alcohol vapor permeability with the change of the thickness of the EVA resin layer, the alcohol vapor permeability can be desirably controlled.

In addition, when the thickness of the EVA resin layer is about 10μ, the adhesive strength of the layer greatly reduces to cause local peeling of the resin layer, whereby the laminated sheet is not suitable for practical use.

In Table 1, Reference Examples 5 and 6, the properties of the samples in the case of changing MI only of the samples in Reference Examples 1 to 4 from 15 to 7 without changing the vinyl acetate content are shown. By comparing the properties of the samples in Reference Examples 5 and 6 with those of the samples in Reference Examples 1 to 4 at the same film thickness, the mechanical strengths such as tensile strength, the tearing strength, the heat seal strength, etc., at MI=7 are stronger than those at MI=15 but no change is observed about the alcohol vapor permeability. Therefore, it can be seen that the mechanical strengths of the bag can be selected by changing MI.

In Table 1, Reference Examples 7 and 8 in comparison with Reference Examples 5 and 6, the properties of the EVA laminated sheet at a vinyl acetate content of 21% and a MI value of 7 are shown, which shows that the alcohol vapor permeability is increased by changing the vinyl acetate content from 19% to 21% at the same laminate thickness. Also, in this case, the mechanical strengths of the laminates are increased.

REFERENCE EXAMPLES 9 AND 10

In Reference Examples 9 and 10, two kinds of laminated papers were prepared by laminating each of ethylene-vinyl acetate copolymer resins having a vinyl acetate content of 22.6% and MI value of 4.5; and a vinyl acetate content of 25.0% and MI value of 2, respectively on the rayon paper as used in Reference Examples 1 to 4 by extruding thereon the resin through a T-die at thicknesses of 33.7μ and 30.9μ, respectively. The alcohol vapor permeability of these samples was 720 and 810 g/m², 24 hr, 40° C., respectively. Other properties of these samples are almost the same as those in Reference Example 8 or higher than those in the reference example.

Thus, by using an ethylene-vinyl acetate copolymer resin having a high vinyl acetate content, a laminated paper having a large alcohol vapor permeability can be obtained.

As described above, it can be seen that by properly selecting the EVA laminate resin layer, the vinyl acetate content of EVA, and MI, the alcohol vapor permeability and the mechanical strengths of the bag made of the EVA laminated paper can be desirably controlled.

COMPARISON EXAMPLE 1

Printing was applied onto a wood free paper having a basis weight of 52.5 g/m² by applying thereon a rubber-acrylic resin printing ink in an amount of 5 g/m². On the back surface of the printed paper was laminated EVA having a vinyl acetate content of 19% and MI of 15 at a thickness of 30.5μ as in the cases of Reference Examples 1 to 4. The water repellency, the oil resistance, the abrasion test, and the alcohol vapor permeability of the laminate paper were evaluated as described below and the results thus obtained are shown in Table 2.

The water repellency was measured according to JIS P-8137. The surface of the sample was inclined at 45°, three water drops, one drop being 0.1 ml, were caused to flow down along the inclined sample surface, the traces of the drops were observed, and the water repellency was evaluated by classifying from the extent that the sample surface was wetted to leave the wet trace of uniform width (water repellency=$R_0$) to the extent that the water drop was completely rolled down along the sample surface (water repellency +$R_{10}$)

Also, the oil resistance was measured by an improved method of TAPPI RC-338. A test liquid composed of castor oil, toluene, and n-heptane having a mixing ratio controlled in proportion to the oil resistance was calmly dropped onto a sample piece placed horizontally, and the oil resistance of the test liquid in the maximum oil resistance of not causing stains by the oil drop was employed as the oil resistance of the test piece. The lowest oil resistance (the test liquid composition: 100% castor oil) was evaluated as 1 and the highest oil resistance (the test liquid composition: 100% n-heptane) as 16.

The abrasion test was performed as follows. After impregnating about 1 g of absorbent cotton with about 7 ml of water, salad oil, ethanol or toluene, the printed surface of the sample was rubbed repeatedly to and fro 10 times along the length of 30 cm with the absorbent cotton, then the abrasion and peeling off of the printed ink was determined. The state was evaluated by 4 ranks; i. e., mark    was a rank that no change was observed on the printed surface and the treated surface and no stain of the printing ink was observed on the rubbed absorbent cotton; mark    was a rank that almost no change was observed on the printed surface and the treated surface but a slight adhesion of the printing ink was observed on the rubbed absorbent cotton; mark Δ was a rank that some peeling off of printed ink was observed on the printed surface and the treated surface and the adhesion of the ink was observed on the absorbent cotton; and mark X was a rank that severe peeling off of the printed ink was observed on the printed surface and the treated surface and the severe adhesion of the ink was observed on the absorbent cotton.

EXAMPLE 1

In 98 parts of water was dissolved 2 parts of polyvinyl alcohol (PVA-117, trade name, made by KURARAY Co., Ltd.) having a degree of hydrolysis of 98.5° and a polymerization degree of 1700 to 2400, and to 50 parts of the solution thus formed was added 50 parts of a perfluoroalkyl acrylate copolymer (Asahi Guard AG-550, trade name, made by Asahi Glass Co., Ltd.) having a total solid content of 2%. Furthermore, 2 parts (as a solid content weight) of a polyoxyethylene alkyl ether agent (Mynex SO, trade name, made by Meisei Kagaku K. K.) was added to the foregoing mixture and the resultant mixture was sufficiently stirred to provide an impregnating liquid. After immersing the printed paper in Comparison Example 1 in the impregnating liquid, the excessive impregnating liquid was squeezed off by means of two rubber rolls, the paper was stuck onto a specularly finished stainless steel plate heated to 120° C., and cured for about 2 minutes. The amount of solid content stuck to the paper was 0.95 g/m². Then, EVA was laminated on the back surface of the printed paper as in Comparison Example 1 and the properties of the laminated sheet thus obtained are shown in Table 2 below.

COMPARISON EXAMPLE 2

An unsized paper having a basis weight of 50 g/m$^2$ was subjected to the oil resisting treatment using the same impregnating liquid as in Example 1 under the same conditions as in the example and then white printing was applied on the paper layer by coating thereon a rubber-acrylic resin printing ink at 5 g/m$^2$. Then, EVA was laminated on the back surface of the printed paper as in Comparison Example 1. The properties of the laminated sheet thus obtained are shown in Table 2 below.

EXAMPLE 2

Printing was applied on an unsized paper having a basic weight of 50 g/m$^2$ by applying thereon a rubber-acrylic resin ink in an amount of 5 g/m$^2$. Apart from this, 50 parts of a perfluoroalkyl acrylate copolymer (Asahi Guard AG-500, trade name, made by Asahi Glass Co., Ltd.) having a total solid content of 2% was added to a solution of 2 parts of polyvinyl alcohol (PVA-117, trade name, made by KURARAY Co., Ltd.) dissolved in 98 parts of water and after further adding thereto 1 part (as solid component weight) of polypropylene glycol (Uniol D-400, trade name, made by Nippon Oil and Fats Co., Ltd.) having a molecular weight of 400, the resultant mixture was sufficiently stirred to provide an impregnating liquid.

The printed paper obtained above was immersed in the impregnating liquid thus obtained and after squeezing the excessive impregnating liquid by means of a squeeze roll, the paper was dried by a drum dryer at 120° C. Wherein, the processing rate was 50 m/min. By adding the penetrating agent, the coating amount of 1.2 g/m$^2$ was secured.

Then, EVA was laminated on the back surface of the printed paper as in Comparison Example 1. The water and oil resistance of the laminated sheet thus obtained was as shown in Table 2 below.

EXAMPLE 3

A mixture of 10 parts of a reactive silicon-acrylic resin aqueous emulsion (Polymex Cylane A14-1, made by Nippon Junyaku K. K.) as solid component and 6 parts of a perfluoroalkyl acrylate copolymer (Asahi Guard AG-550, made by Asahi Glass Co., Ltd.) was diluted with water so that the total solid component content became 20% to provide a coating liquid. The coating liquid was coated on the printed paper as used in Comparison Example 1 by a Mayer bar and then dried at 120° C. for 20 minutes resulting in a coating amount of 2 g/m$^2$. Then, EVA was laminated on the back surface of the printed paper as in Comparison Example 1 and the properties of the laminated sheet thus obtained are shown in Table 2 below.

EXAMPLE 4

A bag of 12 cm × 12 cm was prepared using the laminate paper obtained in Example 3 and 3 ml of ethanol was enclosed in the bag in air free state. The layer of the liquid alcohol in the bag was only 200μ in thickness. In this case, swelling and expansion of the sheet-like bag by the vapor pressure of the liquid alcohol did not occur by the tackiness or the surface tension of the liquid alcohol and the sheet form of the bag was secured. The food-keeping means could be enclosed in a food-containing package as an underlay in a box package or as a food-indicating and food-keeping means. The properties of the food-keeping means are shown in Table 2 below.

EXAMPLE 5

A sheet-form bag of 4.5 cm × 5 cm was prepared using the laminate paper obtained in Example 3, 3 g of a crystalline cellulose powder was placed in the bag, and then pouring therein 1 g of ethanol, the bag was heat-sealed to provide a food-keeping means. The properties of the food-keeping means are shown in Table 2 below.

TABLE 2

| | Comp. Ex. 1 | Comp. Ex. 2 | Ex. 1 | Ex. 2 | Ex. 3 | Ex. 4 | Ex. 5 |
| --- | --- | --- | --- | --- | --- | --- | --- |
| Treatment method | Printing only | Printed on oil resisting paper | Water and oil resisting treatment after printing | " | " | " | " |
| Water repellency | $R_0$ | $R_4$ | $R_4$ | $R_4$ | $R_{10}$ | $R_{10}$ | $R_{10}$ |
| Oil resistance | 0 | 10 | 10 | 10 | 16 | 16 | 16 |
| Abrasion test: | | | | | | | |
| Water | Δ | | | | | | |
| Salad oil | X | X | | | | | |
| Ethanol | X | X | Δ | Δ | | | |
| Alcohol vapor permeability (g/m$^2$ · 24 hr · 40° C.) | 450 | 410 | 434 | 420 | 380 | 370 | 365 |

(Note): Enclosed amount of ethanol = 4 ml/4.5 cm × 5 cm-bag (excluding Examples 4 and 5)
Thickness of EVA film = 29.8μ (Vinyl acetate content = 19%, MI = 15)

EXAMPLES 6 AND 7

By following the same procedure as in Example 1 except that each of the ethylene-vinyl acetate copolymer resins having vinyl acetate contents of 22.6% and 25.0%, respectively, was used for laminating on the back surface of the printed paper by extrusion, two kinds of water resisting and oil resisting laminated sheets in Examples 6 and 7 were produced respectively.

The alcohol vapor permeability of the samples was 658 and 730 g/m$^2$.24 hrs. 40° C., respectively.

EXAMPLE 8

For determining the influence of a liquid alcohol on the oil resistance of the water-resisting and oil-resisting laminated sheet of this invention obtained in Example 1, each of 12 test pieces of 4 cm × 4 cm was immersed in ethanol and after allowing to stand for 1 day, 2 days, 5 days, and 8 days, three test pieces were withdrawn and after air drying at room temperature, the oil resistance of these test pieces was measured. The results are shown in Table 3 below.

COMPARISON EXAMPLES 3 AND 4

By following the same procedure as in Example 1 except that a wax emulsion was used in place of PVA, an oil resisting laminated sheet (Comparison Example 3) was prepared. Also, by following the same procedure as in Example 1 except that a perfluoroalkyl phosphate copolymer was used in place of the perfluoroalkyl acrylate copolymer (Asahi Guard AG-550, trade name, made by Asahi Glass Co., Ltd.), an oil resisting laminated sheet (Comparison Example 4) was prepared. Then, the oil resistance of these samples was measured as in Example 8 and the results are shown in Table 3 below.

EXAMPLE 9 AND COMPARISON EXAMPLES 5 AND 6

For determining the influence of an alcohol vapor on the oil resistance of the water and oil resisting laminated sheet of this invention, a series of bags composed of linearly connected 30 bags each having internal dimensions of 45 mm ×50 mm was prepared using the water-resisting and oil-resisting laminated sheets as used in Example 8, Comparison Example 3 and Comparison Example 4 and 4 ml of ethanol was poured in each bag followed by heat sealing.

Also, 5 sets of similar continuously connected bags were prepared, 4 sets of the continuously connected bags were folded and placed in an outer bag of 200 mm×270 mm made by a laminated film (PVDC (polyvinylidene chloride) coated stretched polypropylene of 23μ/polyethylene of 40μ) having a thickness of 63μ. After degassing the inside of the outer bag, the bag was heat-sealed and was stored in a box at a constant temperature of 40° C.

Each of the 4 continuously connected bags was withdrawn from the outer bag after 5 days, 10 days, 20 days and one month, respectively, 6 connected bags were cut from each of the continuously connected bags, and after air-drying the bags at room temperature, the oil resistance thereof was measured.

The results are shown in Table 4 below.

TABLE 3

| | Oil resistance after immersing in ethanol (unit kit) | | | | |
|---|---|---|---|---|---|
| Sample | Before immersion | After 1 day | After 2 days | After 5 days | After 8 days |
| Example 8 | 11 | 11 | 10 | 10 | 10 |
| Comparison Example 3 | 10 | 4 | 3 | 2 | 1 |
| Comparison Example 4 | 10 | 1 | 1 | 1 | 1 |

TABLE 4

| | Oil resistance after storing in saturated vapor of ethanol | | | | |
|---|---|---|---|---|---|
| Sample | Before storage | After 5 days | After 10 days | After 20 days | After 1 month |
| Example 9 | 11 | 11 | 11 | 10 | 10 |
| Comparison Example 5 | 10 | 8 | 5 | 3 | 2 |
| Comparison Example 6 | 10 | 5 | 2 | 1 | 1 |

As is clear from the results of Examples 1 to 7, Comparison Examples 1 and 2, and Reference Examples 1 to 10 described above, the water-resisting and oil-resisting laminated sheets of this invention show excellent resistance to any solvents as compared with the comparison examples and the alcohol vapor permeability of the laminated sheets of this invention is not inferior to the laminated sheet which was not subjected to a oil resisting treatment in the reference examples, and the extent of the alcohol vapor permeability of the laminated sheets of this invention can be controlled by selecting the thickness of the ethylene-vinyl acetate copolymer laminate layer and the vinyl acetate content.

Furthermore, as is clear from the results (Table 3 and Table 4) of Examples 8 and 9 and Comparison Examples 3 to 6, when the water-resisting and oil-resisting laminated sheets of this invention are allowed to stand in the vapor of ethanol or in liquid ethanol, the oil resistance thereof is scarcely reduced and the durability of the laminated sheets is greatly improved as compared with conventional oil-resisting papers.

What is claimed is:

1. A water-resisting and oil-resisting laminated sheet having an excellent alcohol vapor permeability and an oil resistance which is not reduced by alcohol, said laminated sheet comprising:
   a paper layer; and
   an ethylene-vinyl acetate copolymer layer laminated to said paper layer, which copolymer layer has a vinyl acetate component of 10 to 30 mole %, a melt flow index of 2 to 20, and a thickness of 10 to 50μ;
   wherein said paper layer is subjected to an oil-resisting treatment whereby the paper layer is coated or impregnated with a liquid, and then dried by heating; and
   further wherein said liquid is in an amount of 0.5 to 5% by weight to the paper as solid component and is prepared by mixing an aqueous solution or an aqueous dispersion of at least one oil-resisting polymer selected from the group consisting of a polyvinyl alcohol, polyvinylidene chloride, polyurethane, polychloroprene, and a poly(meth)acrylic acid ester with a perfluoroalkyl acrylate copolymer at 3:7 to 7:3 by solid component weight ratio, adding to the said liquid 0.1 to 3.0% by weight of a penetrating agent selected from the group consisting of a polyethylene glycol having a molecular weight of 200 to 1,000, a polypropylene glycol having a molecular weight of 200 to 1,000, block polymers of such glycols, alkyl ethers of such glycols, and fatty acid esters of such glycols, and diluting with water.

2. The water-resisting and oil-resisting laminated sheet as claimed in claim 1, wherein the paper layer is subjected to the oil-resisting treatment after applying printing on the paper layer.

3. A water-resisting and oil-resisting food-keeping means, capable of controlling the diffusing amount of alcohol vapor, comprising a bag and alcohol or a composition of alcohol enclosed therein, said bag being at least partially composed of a water-resisting and oil-resisting laminated sheet having an excellent alcohol vapor permeability and an oil resistance which is not reduced by alcohol, said laminated sheet comprising:
   a paper layer; and
   an ethylene-vinyl acetate copolymer resin layer laminated to said paper layer, which resin layer has a vinyl acetate component of 10 to 30 mole %, a melt flow index of 2 to 20, and a thickness of 10 to 50μ;

wherein said paper layer is subjected to an oil-resisting treatment whereby the paper layer is coated or impregnated with liquid, and then dried by heating; and further wherein said liquid is in an amount of 0.5 to 5% by weight to the paper as solid component and is prepared by mixing an aqueous solution or an aqueous dispersion of at least one oil-resisting polymer selected from the group consisting of a polyvinyl alcohol, polyvinylidene chloride, polyurethane, polychloroprene, and a poly(meth)acrylic acid ester with a perfluoroalkyl acrylate copolymer at 3:7 to 7:3 by solid component weight ratio, adding to the said liquid 0.1 to 3.0% by weight of a penetrating agent selected from the group consisting of a polyethylene glycol having a molecular weight of 200 to 1,000, a polypropylene glycol having a molecular weight of 200 to 1,000, block polymers of such glycols, alkyl ethers of such glycols, and fatty acid esters of such glycols, and diluting with water.

4. The water-resisting and oil-resisting food-keeping means claimed in claim 3, wherein the paper layer of the laminated sheet for the bag is printed before the oil-resisting treatment.

5. The water-resisting and oil-resisting food-keeping means claimed in claim 3, wherein the bag encloses a powder or particle of carrier absorbing ethyl alcohol.

6. A water-resisting and oil-resisting laminated sheet having an excellent alcohol vapor permeability and an oil resistance which is not reduced by alcohol, said laminated sheet comprising:

a paper layer; and an ethylene-vinyl acetate copolymer layer laminated to said paper layer, which copolymer layer has a vinyl acetate component of 10 to 30 mole %, a melt flow index of 2 to 20, and a thickness of 10 to 50μ;

wherein said paper layer is subjected to an oil-resisting treatment whereby the paper layer is coated with a coating composition, and then dried by heating; and further wherein said coating composition is composed of 100 parts by weight of a reactive silicone-acrylate resin emulsion and 20 to 100 parts by weight of a perfluoroalkyl acrylate copolymer which is diluted with water in an amount of 0.5 to 5% by weight to the paper as solid component.

7. The water-resisting and oil-resisting laminated sheet as claimed in claim 6, wherein the paper layer is subjected to the oil-resisting treatment after applying printing on the paper layer.

8. A water-resisting and oil-resisting food-keeping means, capable of controlling the diffusing amount of alcohol vapor, comprising a bag and alcohol or a composition of alcohol enclosed therein, said bag being at least partially composed of a water-resisting and oil-resisting laminated sheet having an excellent alcohol vapor permeability and an oil resistance which is not reduced by alcohol, said laminated sheet comprising:

a paper layer; and an ethylene-vinyl acetate copolymer resin layer laminated to said paper layer, which resin layer has a vinyl acetate component of 10 to 30 mole %, a melt flow index of 2 to 20, and a thickness of 10 to 50μ;

wherein said paper layer is subjected to an oil-resisting treatment whereby the paper is coated with a coating composition, and then dried by heating; and further wherein said coating composition is composed of 100 parts by weight of a reactive silicone-acrylate resin emulsion and 20 to 100 parts by weight of a perfluoroalkyl acrylate copolymer which is diluted with water in an amount of 0.5 to 5% by weight to the paper as solid component.

9. The water-resisting and oil-resisting food-keeping means claimed in claim 8, wherein the paper layer of the laminated sheet for the bag is printed before the oil-resisting treatment.

10. The water-resisting and oil-resisting food-keeping means claimed in claim 8, wherein the bag encloses a powder or particle of carrier absorbing ethyl alcohol.

* * * * *